(12) United States Patent
Nakagawa et al.

(10) Patent No.: US 9,990,703 B2
(45) Date of Patent: Jun. 5, 2018

(54) VISUALIZATION METHOD AND APPARATUS

(71) Applicants: FUJITSU LIMITED, Kawasaki-shi, Kanagawa (JP); The University of Tokyo, Tokyo (JP)

(72) Inventors: Machiko Nakagawa, Kawasaki (JP); Toshiaki Hisada, Tokyo (JP); Seiryo Sugiura, Tokyo (JP); Takumi Washio, Tokyo (JP); Jun-ichi Okada, Tokyo (JP)

(73) Assignees: FUJITSU LIMITED, Kawasaki (JP); The University of Tokyo, Tokyo (JP)

( * ) Notice: Subject to any disclaimer, the term of this patent is extended or adjusted under 35 U.S.C. 154(b) by 150 days.

(21) Appl. No.: 14/582,326

(22) Filed: Dec. 24, 2014

(65) Prior Publication Data

US 2015/0193961 A1 Jul. 9, 2015

(30) Foreign Application Priority Data

Jan. 9, 2014 (JP) ................................. 2014-002166

(51) Int. Cl.
*G06T 17/00* (2006.01)
*G06T 5/00* (2006.01)
(Continued)

(52) U.S. Cl.
CPC .............. *G06T 5/009* (2013.01); *G06T 19/00* (2013.01); *G06T 19/20* (2013.01); *G06T 2219/008* (2013.01); *G06T 2219/2012* (2013.01)

(58) Field of Classification Search
CPC ......... G06T 5/009; G06T 19/00; G06T 19/20; G06T 2219/008; G06T 2219/2012; G06T 2207/10024; G06T 2207/10072; G06T 2207/10081; G06T 2207/30048; G06T 5/008; G06T 2200/04; G06T 2207/10136; G06T 7/11; G06T 2207/10004;
(Continued)

(56) References Cited

U.S. PATENT DOCUMENTS

2002/0012473 A1* 1/2002 Kondo .................... G06T 9/004
382/246
2006/0017748 A1 1/2006 Ozawa
(Continued)

FOREIGN PATENT DOCUMENTS

JP 9-81786 3/1997
JP 2006-25885 2/2006
(Continued)

*Primary Examiner* — Xilin Guo
(74) *Attorney, Agent, or Firm* — Oblon, McClelland, Maier & Neustadt, L.L.P.

(57) ABSTRACT

In this visualization method, for each brightness value for voxels included in a predetermined Region Of Interest (ROI) in a three-dimensional volume data, opacity is set according to an appearance frequency of the brightness value. Then, three-dimensional image data is generated for a portion on and under a cross section set for the three-dimensional volume data, by using color data that corresponds to a brightness value of each voxel included in the ROI and the opacity of each brightness value. Then, a cross section image generated from data of voxels on the cross section and the three-dimensional image data are superimposed and displayed.

6 Claims, 9 Drawing Sheets

(51) Int. Cl.
*G06T 19/00* (2011.01)
*G06T 19/20* (2011.01)

(58) Field of Classification Search
CPC ............. G06T 5/50; G06T 2207/20104; G06T 7/0012; G06F 17/2785; G06F 17/30247; G06F 17/30256; G06F 17/30259; G06F 17/30371; G06F 17/30781; G06F 17/30817; G06F 17/3082
See application file for complete search history.

(56) References Cited

U.S. PATENT DOCUMENTS

| | | | |
|---|---|---|---|
| 2006/0056726 A1* | 3/2006 | Fujiwara | G06T 15/08 382/276 |
| 2010/0149174 A1 | 6/2010 | Nakao et al. | |
| 2013/0021335 A1 | 1/2013 | Arakita et al. | |
| 2013/0177229 A1* | 7/2013 | Inoue | A61B 8/14 382/131 |
| 2014/0187936 A1* | 7/2014 | Nakamura | A61B 5/7425 600/437 |

FOREIGN PATENT DOCUMENTS

| | | |
|---|---|---|
| JP | 2007-289569 | 11/2007 |
| JP | 2013-25486 | 2/2013 |
| WO | WO 2007/015365 A1 | 2/2007 |

\* cited by examiner

US 9,990,703 B2

VISUALIZATION METHOD AND APPARATUS

CROSS-REFERENCE TO RELATED APPLICATIONS

This application is based upon and claims the benefit of priority of the prior Japanese Patent Application No. 2014-002166, filed on Jan. 9, 2014, the entire contents of which are incorporated herein by reference.

FIELD

This technique relates to a visualization apparatus and method.

BACKGROUND

In a medical site, an Ultra-sonic echo apparatus, Magnetic Resonance Imaging apparatus, Computed Tomography scan apparatus or the like, which is a medical measurement equipment, is used to measure information of an organ such as a cross section of the heart muscle of the heart. For example, the information of the cross section of the heart muscle is two-dimensional image data, typically.

On the other hand, as a visualization method to observe complex three-dimensional structure, an isosurface display, cross-section display, volume rendering and the like are well-known.

And, for example, in Laid-open patent publication 2006-25885, a technique is disclosed in which a Region Of Interest (ROI) is set on the cross section of the organ, and a result of the volume rendering is represented in the ROI to enable users to recognize the three-dimensional image, locally. However, this document does not disclose the detailed setting of transparency or opacity when the volume rendering is performed, or merely discloses a case where the opacity is fixedly set for the brightness. According to this technique, the user's desired display may not be obtained.

Patent Document 1: Japanese Laid-open Patent Publication No. 2006-25885

Patent Document 2: Japanese Laid-open Patent Publication No. 09-81786

SUMMARY

A visualization method relating to this invention includes: (A) setting, for each brightness value for voxels included in a predetermined Region Of Interest (ROI) in a three-dimensional volume data, opacity according to an appearance frequency of the brightness value; (B) generating three-dimensional image data for a portion on and under a cross section set for the three-dimensional volume data, by using color data that corresponds to a brightness value of each voxel included in the ROI and the opacity of each brightness value; and (C) superimposing and displaying a cross section image generated from data of voxels on the cross section and the three-dimensional image data.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Figure 1:
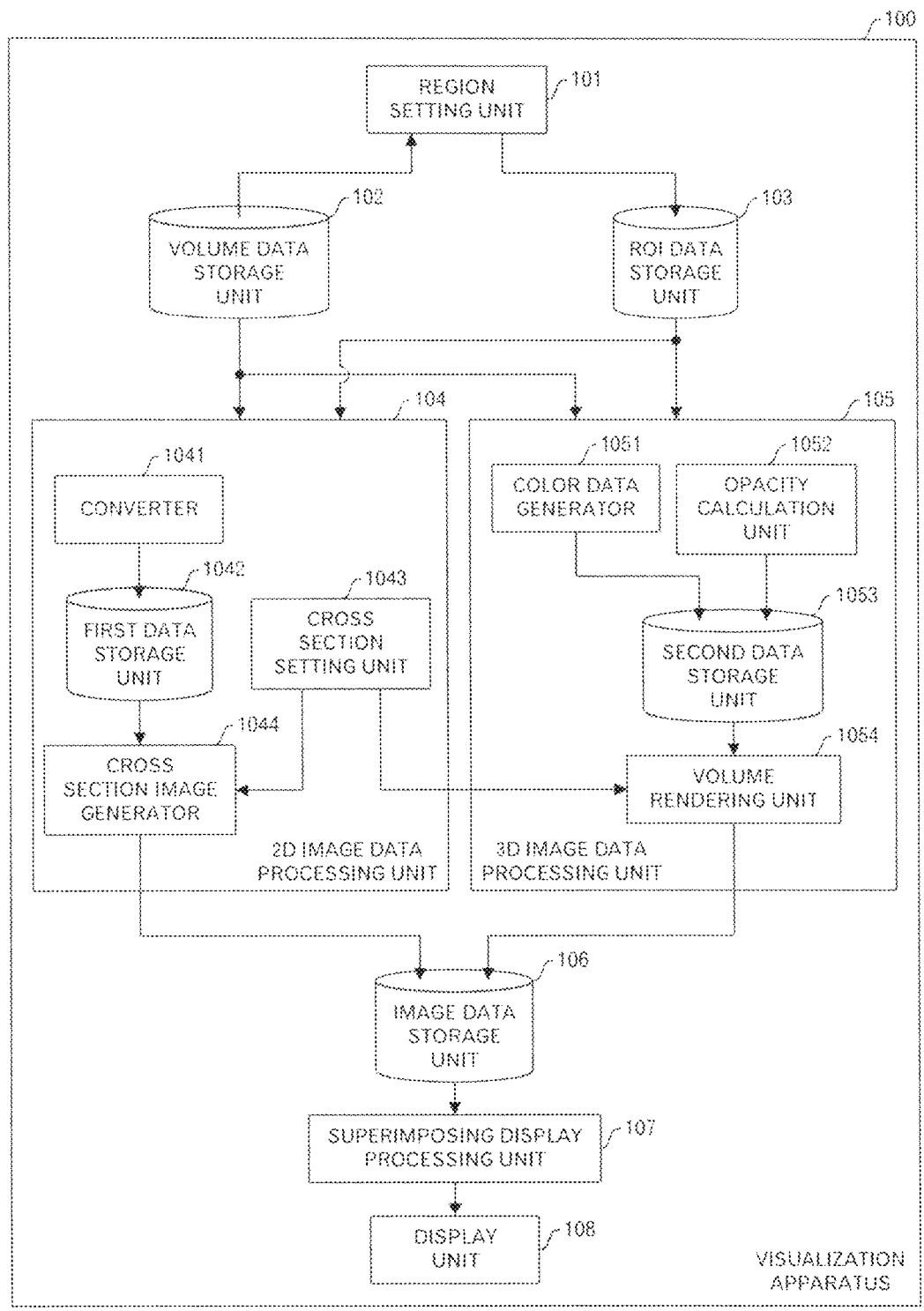
FIG. 1 is a functional block diagram of a visualization apparatus relating to an embodiment of this invention.

FIG. 1 illustrates a functional block diagram of a visualization apparatus 100 relating to an embodiment of this invention. This visualization apparatus 100 has a region setting unit 101, a volume data storage unit 102, an ROI data storage unit 103, a 2D image data processing unit 104, a 3D image data processing unit 105, an image data storage unit 106, a superimposing display processing unit 107 and a display unit 108.

The volume data storage unit 102 stores volume data of an organ or the like to be processed. The volume data is data in which a cross section image of an organ or the like, which was observed by CT or MRI, is arranged at intervals of a predetermined slice width in the three-dimensional space. In the volume data, a unit corresponding to a pixel of the cross section is called "voxel", and a brightness value is set to the voxel. As for the brightness values, 256 normalized levels are set, for example.

The region setting unit 101 performs a processing to set the ROI in the volume data according to a user's instruction or according to a predetermined algorithm, and stores data to identify the ROI in the ROI data storage unit 103.

The 2D image data processing unit 104 generates two-dimensional image data of a cross section designated, for example, by the user, and has a converter 1041, a first data storage unit 1042, a cross section setting unit 1043 and a cross section image generator 1044.

The converter 1041 performs a processing to convert the brightness value to data in an RGBA (Red Green Blue Alpha) format, and stores the processing result in the first data storage unit 1042. The cross section setting unit 1043 sets a cross section to be displayed in the volume data according to the user's instruction or the like. The cross section image generator 1044 generates data of the cross section image for the set cross section by using data stored in the first data storage unit 1042, and stores the generated data in the image data storage unit 106.

Moreover, the 3D image data processing unit 105 generates the three-dimensional image data for a portion on and under the set cross section in the ROI, and has a color data generator 1051, an opacity calculation unit 1052, a second data storage unit 1053 and a volume rendering unit 1054.

The color data generator 1051 generates color data for each voxel in the ROI, and stores the generated data in the second data storage unit 1053. The opacity calculation unit 1052 calculates the opacity for each brightness value according to appearance frequencies of the brightness values of the voxels in the ROI, and stores the calculated data in the second data storage unit 1053. The volume rendering unit 1054 performs volume rendering for portions on and under the set cross section by using data stored in the second data storage unit 1053, and stores the generated three-dimensional image data in the image data storage unit 106.

The superimposing display processing unit 107 superimposes the cross section image and the three-dimensional image in the ROI, by using data stored in the image data storage unit 106, to display the superimposed display data on the display unit 108.

Next, processing contents of the visualization apparatus 100 will be explained by using FIGS. 2 to 14. Firstly, the region setting unit 101 sets an ROI in the volume data, and stores data to identify the ROI in the ROI data storage unit 103 (step S1). As for the setting of the ROI, a method for manually setting a region by the user, or a method for designating a range of brightness values that the user would like to observe by one or plural threshold, or a setting method such as Region Growing method may be used.

Then, the 2D image data processing unit 104 performs a 2D image data generation processing by using data stored in the volume data storage unit 102 and data stored in the ROI data storage unit 103, and stores the generated two-dimensional image data in the image data storage unit 106 (step S3). This processing will be explained by using FIGS. 3 to 5.

The converter 1041 converts the brightness values of the voxels stored in the volume data storage unit 102 into data in the RGBA format, and stores the generated data in the first data storage unit 1042 (step S11).

In this embodiment, the brightness values of the voxels are converted into gray-scale color data with 256 gradations. Moreover, as for the α value that represents the opacity, for example, 0 (which represents being transparent) is set to the voxels within the ROI so that the background color penetrates, and for example, 255 (which represents being opaque) is set to the voxels outside the ROI so that the background color does not penetrate. Reversely, in case that the α value represents the transparency, for example, 255 (which represents being transparent) is set to the voxels within the ROI so that the background color penetrates, and for example, 0 (which represents being opaque) is set to the voxels outside the ROI so that the background color does not penetrate. In this embodiment, as the α value, any one of the transparency and the opacity may be employed.

Then, the cross section setting unit 1043 sets the cross section position according to the user's instruction, for example (step S13). The cross section setting unit 1043 outputs data of the set cross section position to the cross section image generator 1044 and the 3D image data processing unit 105.

After that, the cross section image generator 1044 generates data of the cross section image by slicing the volume data at the set cross section position, and stores the generated data in the image data storage unit 106 (step S15).

Figure 4:
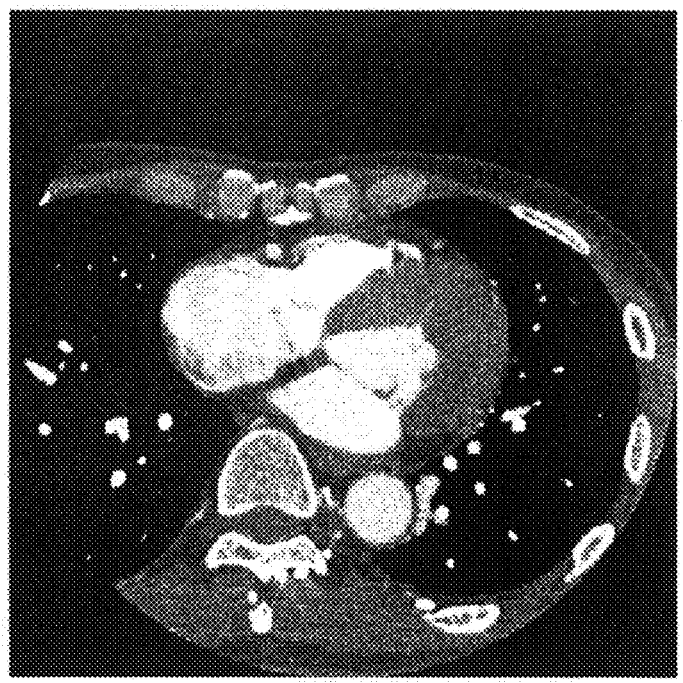
FIG. 4 is a diagram depicting an example of a normal cross section image.
Figure 5:
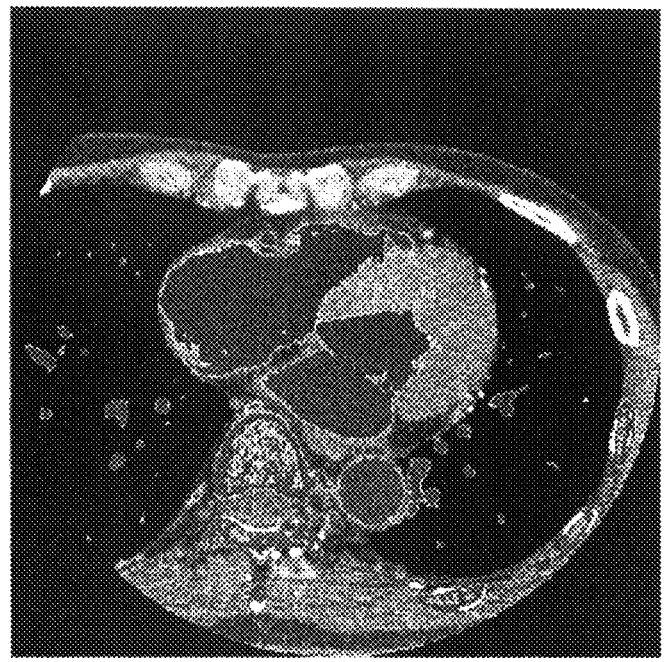
FIG. 5 is a diagram depicting an example of a cross section image generated by the two-dimensional image data generation processing.

For example, in case where the cross section image obtained by CT or MRI is an image as illustrated in FIG. 4, and the ROI is set almost to white portions, the cross section image as illustrated in FIG. 5 is generated at the step S15. In FIG. 5, a background gray penetrates in the ROI (almost white portions in FIG. 4), however, the similar image to FIG. 4 is included outside the ROI.

Figure 2:
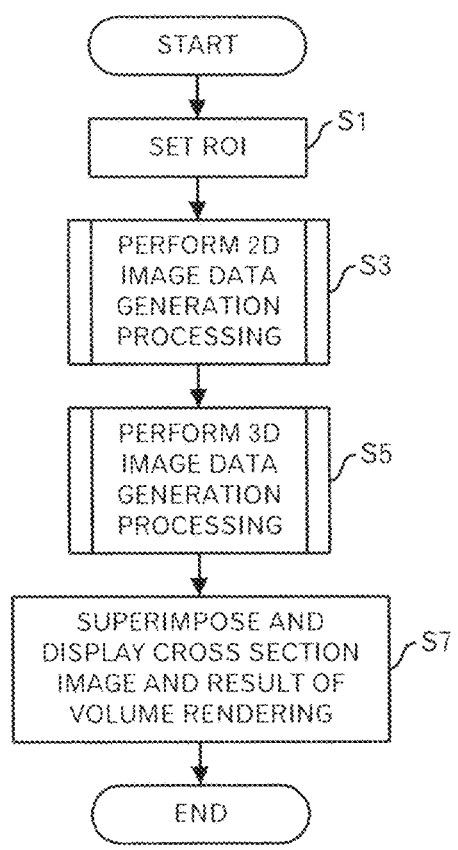
FIG. 2 is a diagram depicting a processing flow of a main processing relating to the embodiment.
Figure 3:
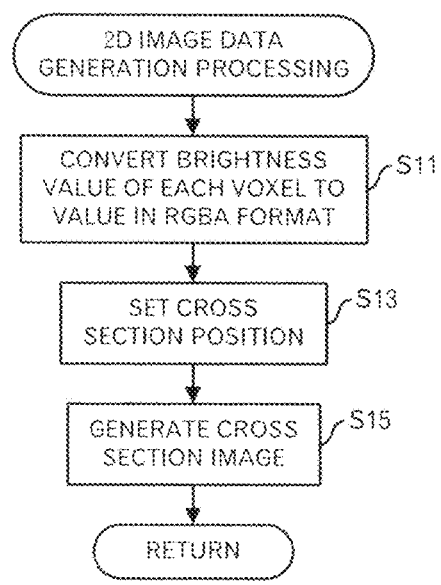
FIG. 3 is a diagram depicting a processing flow of a two-dimensional image data generation processing.

Returning to the explanation of the processing in FIG. 2, the 3D image data processing unit 105 performs a 3D image data generation processing by using data stored in the ROI data storage unit 103 and data stored in the volume data storage unit 102, and stores the generated three-dimensional image data in the image data storage unit 106 (step S5). This processing will be explained by using FIGS. 6 to 9.

Firstly, the 3D image data processing unit 105 extracts volume data within the ROI from the volume data storage unit 102 based on the data to identify the ROI, which is stored in the ROI data storage unit 103 (step S21).

Then, the color data generator 1051 in the 3D image data processing unit 105 generates color data in the ROI, and stores the color data in the second data storage unit 1053 (step S23). As for this processing, the brightness value of each voxel included in the extracted volume data may be employed as it is, however, in order to generate a realistic three-dimensional image, a light source is set to use results of shading such as Phong shading. For example, the diffuse reflection in Phong shading is represented as follows:

Here, i, j and k respectively represent coordinate values in the x, y and z axes, N represents a normal vector, L represents a direction vector of the light source, and f(i, j, k) represents a brightness value at the coordinates (i, j, k). Then, the color data C(i, j, k) is represented as follows:

$$C(i,j,k) = \text{dot}(N_{i,j,k}, L) \times f(i,j,k)$$

dot (X, Y) represents an inner product of a vector X and a vector Y.

Here, the normal vector N is calculated from the gradient of brightness values of surrounding voxels.

$$N_{i,j,k} = \frac{\text{grad } f(i,j,k)}{\|\text{grad } f(i,j,k)\|}$$

$$\text{grad } f(i,j,k) = ((f(i+1,j,k)-f(i+1,j,k))/2, (f(i,j+1,k)-f(i,j+1,k))/2, (f(i,j,k+1)-f(i,j,k+1))/2)$$

Moreover, the opacity calculation unit 1052 calculates, for each brightness value, the opacity according to the appearance frequencies of the brightness values in the ROI, and stores calculation results in the second data storage unit 1053 (step S25).

In this embodiment, the lower opacity is assigned to a brightness value having the higher appearance frequency in the ROI, and the higher opacity is assigned to a brightness value having the lower appearance frequency in the ROI. Accordingly, because a portion that will occupy the bigger area on the ROI is represented by the three-dimensional image, it seems that the inner structure in the ROI is visualized for the user.

Figure 7:
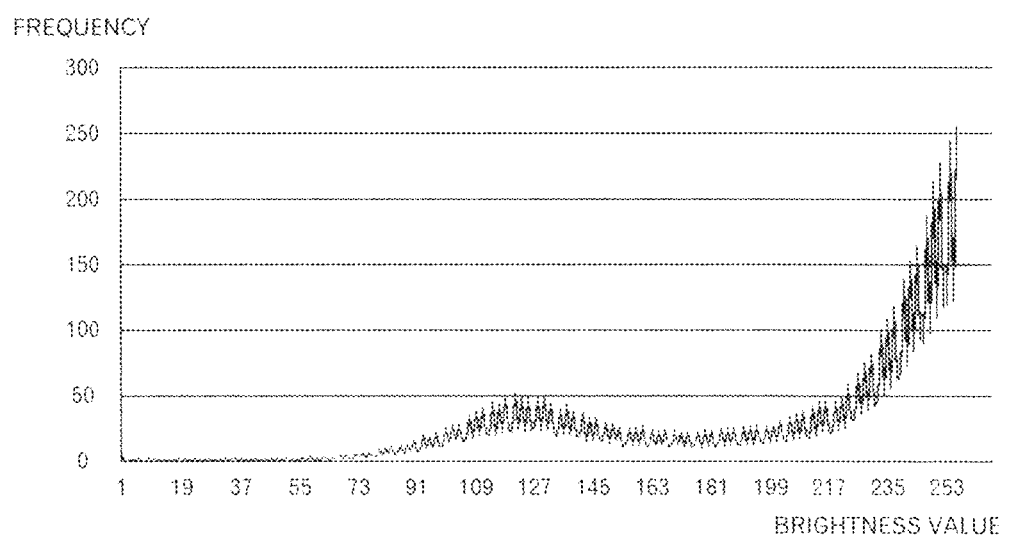
FIG. 7 is a diagram depicting appearance frequencies of brightness values.
Figure 6:
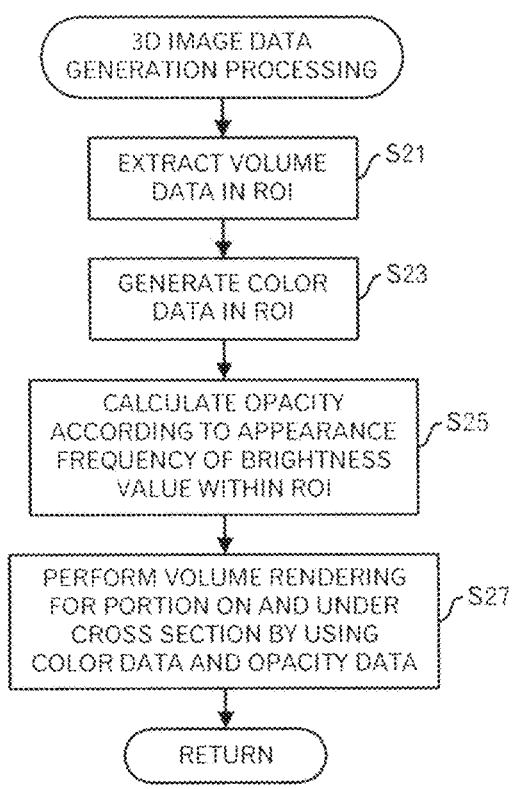
FIG. 6 is a diagram depicting a processing flow of a three-dimensional image data generation processing.

However, when the appearance frequency for the image that has a lot of noises such as the medical image is counted simply, discontinuous distribution as illustrated in FIG. 7 may be obtained. Then, in order to obtain smooth distribution of the appearance frequency, Parzen Window is employed, for example. Parzen Window is a method for obtaining frequency distribution that does not depend on the width of the rank, and is known as a method that the smooth distribution can be obtained for the observed values with the noise. However, instead of Parzen Window, the polynomial approximation or mixture of Gaussian distribution may be employed.

Figure 8:
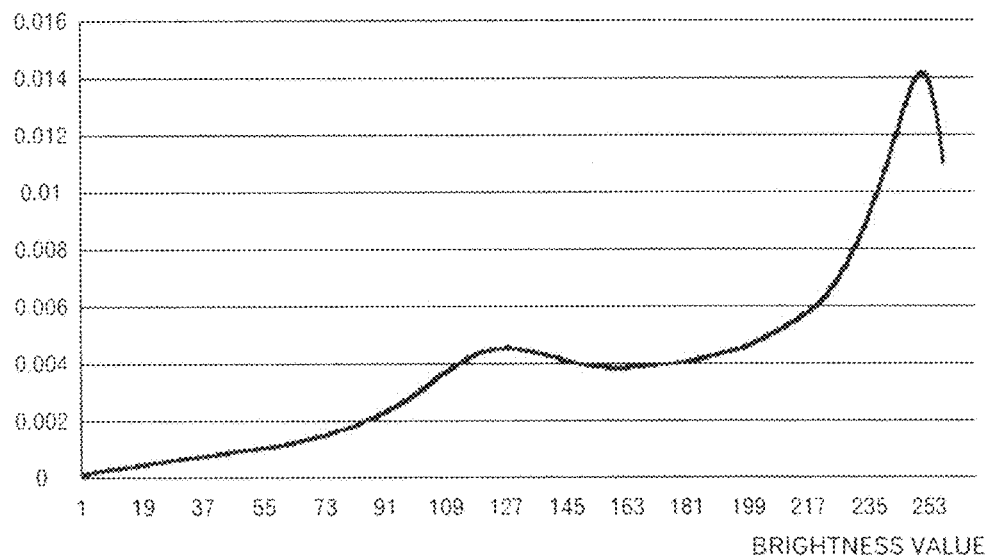
FIG. 8 is a diagram depicting distribution of appearance probabilities of the brightness values.

For example, the appearance probability distribution of the brightness values, which is obtained by using Parzen Window from the distribution as illustrated in FIG. 7, is represented as illustrated in FIG. 8. When observed values $x_i$ (i=1, n) are obtained, Parzen Window is represented by a following expression.

However, $f_p(x)$ represents the appearance probability that the brightness value x is observed, and K(z) is a kernel function, such as Gaussian kernel. h represents a band width, and 5 is used for example.

$$f_p(x) = \frac{1}{Nh} \sum_{i=1}^{N} K\left(\frac{x - x_i}{h}\right)$$

$$K(z) = \frac{1}{\sqrt{2\pi}} e^{-\frac{1}{2}z^2}$$

Figure 9:
FIG. 9 is a diagram depicting an example of the opacities corresponding to the brightness values

Then, the opacity is lowered for a brightness value whose appearance probability is high, and the opacity is heightened for a brightness value whose appearance probability is low. In other words, in case of the appearance probability distribution as illustrated in FIG. 8, settings of the opacity are made as illustrated in FIG. 9. More specifically, the opacity $f_\alpha$ for the brightness value x is represented as follows:

$$f_\alpha(x) = 255 - \frac{f_p(x)}{f_{\alpha\_max}} * 255$$

$f_{\alpha\_max}$ represents the maximum value of the appearance probability. Instead of the opacity, the transparency may be calculated.

Then, the volume rendering unit 1054 performs volume rendering for portions on and under the set cross section position by using the color data and the opacity data, and stores processing results in the image data storage unit 106 (step S27). Then, the processing returns to the calling-source processing.

The volume rendering is performed by using the color C(i, j, k) of each voxel and the opacity $f_\alpha$. As the representative method of the volume rendering, the raycasting method may be employed. The raycasting method is a method that the pixel values on a screen are calculated by emitting a ray corresponding to a sight line from each pixel on the screen, and superimposing values of crossed voxels with the ray. When the crossed voxels in order of closeness to the view point are represented by $v_0, v_1, \ldots v_m$, the pixel value is represented as follows:

$$C = \sum_{i=0}^{m} f_\alpha(f_{v_i}) c(v_i) \prod_{j=0}^{i-1} \left(1 - f_\alpha(f_{v_j})\right)$$

$f_{v_i}$ represents the brightness value of the voxel $v_i$.

By performing such a processing, the three-dimensional image data in the ROI is generated.

Returning to the explanation of the processing in FIG. 2, the superimposing display processing unit 107 superimposes the cross section image data and the volume rendering result, which are stored in the image data storage unit 106, to cause the display unit 108 to display the processing result (step S7).

Because the α values are set for the cross section image, the volume rendering result is synthesized with the cross section image by using the α value, in other words, the α blending is performed. As described above, because the regions other than the ROI are opaque, only the cross section image is displayed for the regions other than the ROI, and because the ROI is transparent, the result of the volume rendering is displayed for the ROI.

Figure 10:
FIG. 10 is a diagram depicting an example of a normal cross section image.
Figure 11:
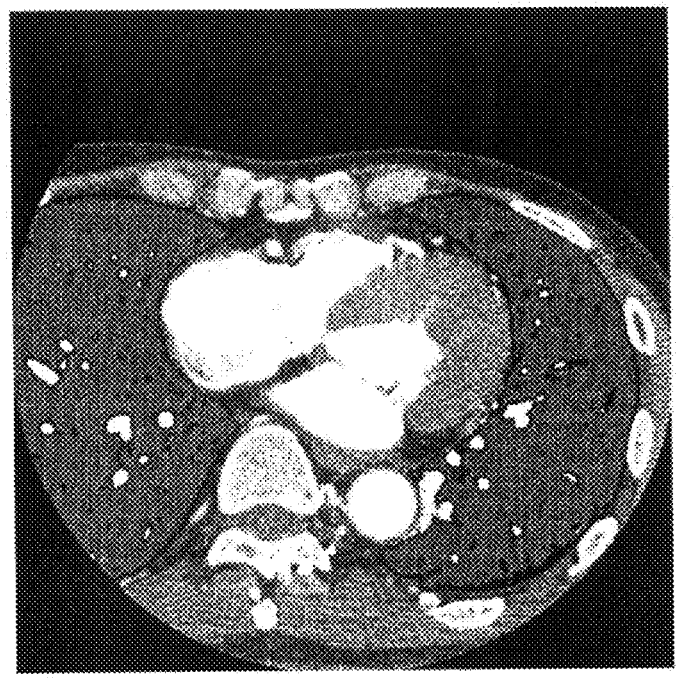
FIG. 11 is a diagram depicting a setting example of a Region Of Interest (ROI)
Figure 12:
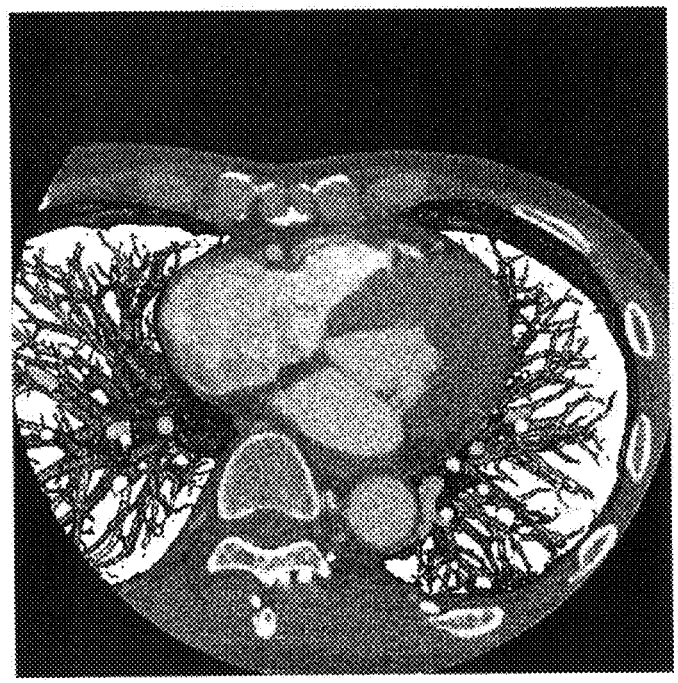
FIG. 12 is a diagram depicting an example of a processing result in this embodiment.
Figure 13:
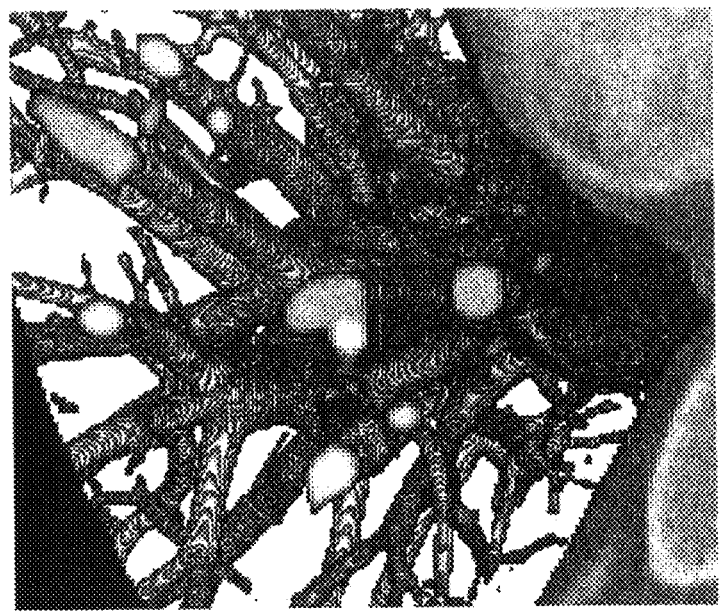
FIG. 13 is a diagram depicting an example of an expanded result of a portion in FIG. 12.
Figure 14:
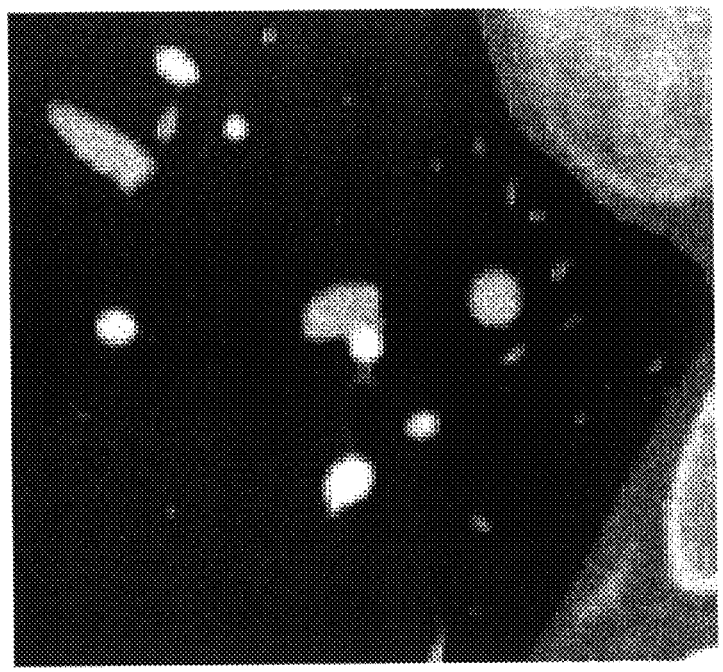
FIG. 14 is a diagram depicting an example of an expanded result of the same portion in FIG. 10 as that in FIG. 13.

For example, it is assumed that the measurement result by CT or MRI is as illustrated in FIG. 10. Then, when the ROI is set to a lung portion as illustrated in FIG. 11, an image as illustrated in FIG. 12 is displayed on the display unit 108 according to this embodiment. Thus, the structure within the lung is visualized. When a portion of the ROI is expanded, an image as illustrated in FIG. 13 is obtained. On the other hand, when a range, which is similar to FIG. 13, in the image in FIG. 10 is expanded, an image as illustrated in FIG. 14 is obtained. Thus, when display in FIG. 12 and/or FIG. 13 is made, the user can easily understand the structure in the ROI.

Although the embodiments of this invention were explained, this invention is not limited to the embodiments. For example, as for the processing flow, as long as the processing result does not change, the turns of the steps may be exchanged and plural steps may be executed in parallel.

The functional block configuration of the visualization apparatus 100 illustrated in FIG. 1 may not correspond to a program module configuration. The configuration of the data storage units may not correspond to a file configuration.

In the aforementioned embodiments, data in the RGBA format is generated for the entire volume data so as to generate the cross section image for each cross section, the cross section position may be designated beforehand and data in the RGBA format may be generated only for the cross section.

Furthermore, the visualization apparatus 100 may be implemented by plural computers instead of one computer.

Figure 15:
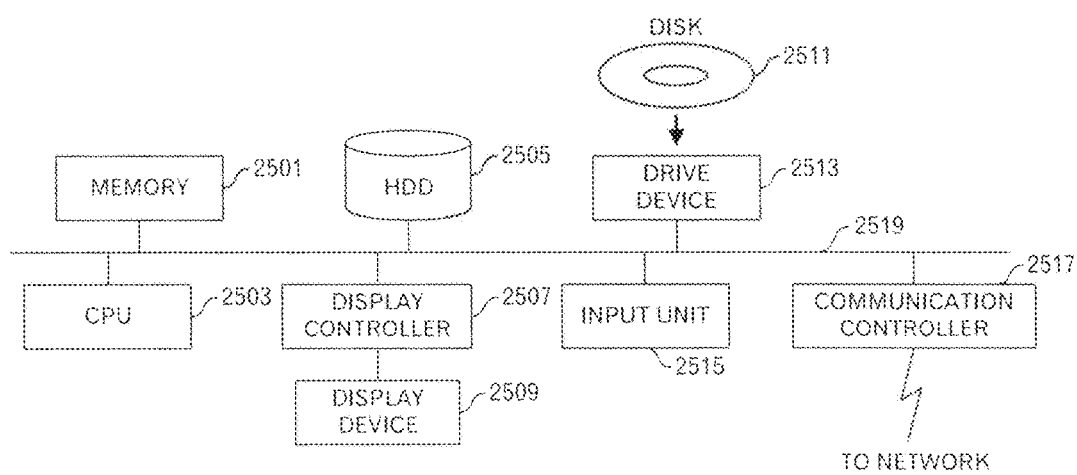
FIG. 15 is a functional block diagram of a computer.

In addition, the aforementioned visualization apparatus 100 is a computer device as shown in FIG. 15. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as shown in FIG. 15. An operating system (OS) and an application program for carrying out the foregoing processing in the embodiment, are stored in the HDD 2505, and when executed by the CPU 2503, they are readout from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The aforementioned embodiments are outlined as follows:

A visualization method relating to the embodiments includes: (A) setting, for each brightness value for voxels included in a Region Of Interest (ROI) set in a three-dimensional volume data, opacity or transparency according to an appearance frequency of the brightness value; (B) generating three-dimensional image data for a portion on and under a cross section set for the three-dimensional volume data, by using color data that corresponds to a brightness value of each voxel included in the ROI and the opacity or transparency of each brightness value; and (C) superimposing and displaying a cross section image generated from data of voxels on the cross section and the three-dimensional image data.

By setting the opacity or transparency according to the appearance frequency of the brightness value, an image to clarify the structure within the ROI is displayed.

Moreover, the generating may be performed by the volume rendering.

Furthermore, the generating may include: generating the color data by performing shading based on brightness values of voxels included in the ROI. The realistic three-dimensional structure can be obtained.

Furthermore, the color data that corresponds to the brightness value of the voxel and an α value that represents the voxel is transparent when the voxel is within the ROI or an α value that represents the voxel is opaque when the voxel is outside the ROI may be set for the voxel on the cross section. In such a case, the superimposing and displaying may include superimposing the cross section image and the three-dimensional image data by using the α value. Thus, the three-dimensional image is displayed only within the ROI on the cross section.

The aforementioned setting may include: setting the opacity or transparency so that a voxel that has a brightness value of a higher appearance frequency becomes much transparent and a voxel that has a brightness value of a lower appearance frequency becomes opaquer. Thus, the opacity or transparency is set to make it easy to understand the inner structure.

Moreover, the setting may include: converting distribution of appearance frequencies of brightness values to smooth distribution of appearance probabilities; and setting the opacity or transparency so that a voxel that has a brightness value of a higher appearance probability becomes much transparent and a voxel that has a brightness value of a lower appearance probability becomes opaquer. The opaque or transparency can be set naturally by the smoothing.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory such as ROM (Read Only Memory), and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A visualization apparatus, comprising:
   a memory; and
   a processor coupled to the memory and configured to:
      calculate, for each brightness value for voxels included in a predetermined Region Of Interest (ROI) in three-dimensional volume data, an appearance frequency of the brightness value, wherein the brightness value is a normalized value representing a gray-scale brightness of a voxel for which the brightness value is set;
      calculate, for each brightness value for the voxels included in the predetermined ROI, an appearance probability that the brightness value appears in the voxels included in the predetermined ROI, based on distribution of the calculated appearance frequencies;
      set, for each brightness value for the voxels included in the predetermined ROI, opacity so that a voxel that has a brightness value of a higher appearance probability becomes more transparent and a voxel that has a brightness value of a lower appearance probability becomes more opaque;
      generate three-dimensional image data for a portion on and under a cross section that is set for the three-dimensional volume data, by using the opacity of each brightness value and color data that corresponds to a brightness value of each voxel included in the predetermined ROI;
      synthesize a cross section image generated from data of voxels on the cross section and the three-dimensional image data by using a transparency value that is set for the cross section image; and
      display an image obtained by the synthesizing.

2. The visualization apparatus as set forth in claim 1, wherein the generating comprises generating the three-dimensional image data by performing volume rendering.

3. The visualization apparatus as set forth in claim 1, wherein the processor is further configured to generate the color data by performing shading based on brightness values of the voxels included in the predetermined ROI.

4. The visualization apparatus as set forth in claim 1, wherein the processor is further configured to set higher opacity than opacity that is set for a voxel included in the predetermined ROI to a voxel that is not included in the predetermined ROI upon detecting that a voxel on the cross section is not included in the predetermined ROI.

5. A visualization method, comprising:
   calculating, by using a computer and for each brightness value for voxels included in a predetermined Region of Interest (ROI) in three-dimensional volume data, an appearance frequency of the brightness value, wherein the brightness value is a normalized value representing a gray-scale brightness of a voxel for which the brightness value is set;
   calculating, by using the computer and for each brightness value for the voxels included in the predetermined ROI, an appearance probability that the brightness value appears in the voxels included in the predetermined ROT, based on distribution of the calculated appearance frequencies to smooth distribution of appearance probabilities;

setting, by using the computer and for each brightness value for the voxels included in the predetermined ROI, opacity so that a voxel that has a brightness value of a higher appearance probability becomes more transparent and a voxel that has a brightness value of a lower appearance probability more opaque;

generating, by using the computer, three-dimensional image data for a portion on and under a cross section that is set for the three-dimensional volume data, by using the opacity of each brightness value and color data that corresponds to a brightness value of each voxel included in the predetermined ROI;

synthesizing, by using the computer, a cross section image generated from data of voxels on the cross section and the three-dimensional image data by using a transparency value that is set for the cross section image; and displaying, by using the computer, an image obtained by the synthesizing.

6. A non-transitory computer-readable storage medium storing a program that causes a computer to execute a process, the process comprising:

calculating, for each brightness value for voxels included in a predetermined Region of Interest (ROI) in three-dimensional volume data, an appearance frequency of the brightness value, wherein the brightness value is a normalized value representing a gray-scale brightness of a voxel for which the brightness value is set;

calculating, for each brightness value for the voxels included in the predetermined ROI, an appearance probability that the brightness value appears in the voxels included in the predetermined ROI, based on distribution of the calculated appearance frequencies to smooth distribution of appearance probabilities;

setting, for each brightness value for the voxels included in the predetermined ROI, opacity so that a voxel that has a brightness value of a higher appearance probability becomes more transparent and a voxel that has a brightness value of a lower appearance probability becomes more opaque;

generating three-dimensional image data for a portion on and under a cross section that is set for the three-dimensional volume data, by using the opacity of each brightness value and color data that corresponds to a brightness value of each voxel included in the predetermined ROI;

synthesizing a cross section image generated from data of voxels on the cross section and the three-dimensional image data by using a transparency value that is set for the cross section image; and displaying an image obtained by the synthesizing.

* * * * *